United States Patent
Dent

(10) Patent No.: US 7,046,738 B1
(45) Date of Patent: May 16, 2006

(54) 8-PSK TRANSMIT FILTERING USING REDUCED LOOK UP TABLES

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/500,366

(22) Filed: Feb. 8, 2000

(51) Int. Cl.
*H04K 1/02* (2006.01)
*H04L 25/03* (2006.01)

(52) U.S. Cl. ............... 375/296; 375/278; 375/284; 375/285; 375/135; 375/146; 332/103; 332/107

(58) Field of Classification Search ........... 375/296, 375/285, 284, 281, 308, 219, 324, 265, 341, 375/278, 262, 298, 261, 135, 242, 238, 146; 714/792, 261, 796; 370/232, 342; 455/69; 332/103, 107
See application file for complete search history.

(56) References Cited

U.S. PATENT DOCUMENTS

| | | | |
|---|---|---|---|
| 4,812,786 A * | 3/1989 | Davarian et al. | 332/103 |
| 4,965,536 A * | 10/1990 | Yoshida | 332/103 |
| 5,428,643 A * | 6/1995 | Razzell | 375/308 |
| 5,530,722 A | 6/1996 | Dent | |
| 5,673,291 A * | 9/1997 | Dent | 375/262 |
| 5,867,537 A * | 2/1999 | Dent | 375/298 |
| 6,553,079 B1 * | 4/2003 | Piirainen | 375/269 |

FOREIGN PATENT DOCUMENTS

EP  0 584 872 A1  3/1994

OTHER PUBLICATIONS

Allan, R.D.; Bramwell, J.R.; Saunders, D.A.; Tomlinson, M.; "A high performance satellite data modem using real-time digital signal processing techniques," Journal of the Institution of Electronic and Radio Engineers, vol. 58, No. 3, pp. 117-124.

* cited by examiner

*Primary Examiner*—Stephen Chin
*Assistant Examiner*—Ted M. Wang
(74) *Attorney, Agent, or Firm*—Coats & Bennett, P.L.L.C.

(57) ABSTRACT

A method for generating a premodulation-filtered modulation waveform having a real part and an imaginary part for transmitting octal symbols uses a reduced lookup table. Successive octal symbols, each comprising three information bits, are input to a logic unit. The logic unit forms a first derived bit by combining the first and third information bits and a second derived bit by combining the second and third information bits. The first and second information bits, along with the first and second derived bits, are delayed in respective L-bit shift registers. The bit sequences in the L-bit shift registers are used to determine a corresponding filtered waveform segment for each bit sequence. The waveform segments corresponding to the delayed first information bits and the delayed first derived bits are combined to obtain a segment of said imaginary waveform part. The waveform segments corresponding to the delayed second information bits and delayed second derived bits are combined to obtain a segment of said real waveform part.

75 Claims, 5 Drawing Sheets

8-PSK TRANSMIT FILTERING USING REDUCED LOOK UP TABLES

FIELD OF THE INVENTION

The present invention relates generally to a method and apparatus to perform phase modulation in a digital communications system, and more particularly, to a method and apparatus to perform phase modulation using reduced look-up tables.

BACKGROUND OF THE INVENTION

In the prior art of digital radio communication, it is well known that linearly filtered transmissions can achieve superior spectral containment, thus reducing adjacent channel interference. Linearly filtered transmissions may be produced according to the prior art by applying information-symbol-representative impulses to a premodulation filter of desired characteristics. Such impulses, in the case of binary symbols, are impulses of area either +1 or −1. In the case of complex modulation, which produces both variations of the signal phase and amplitude creating a time-varying signal vector in the two-dimensional complex plane, the symbol-representative impulses have both a real (x or In-phase) part usually denoted by $I_i$, and an imaginary (y or Quadrature) part denoted by $Q_i$. The complex symbol $S_i=I_i+jQ_i$ may be filtered by separately filtering the I and Q sequences.

It is also known in the prior art that filtering may be performed using Finite Impulse Response (FIR) filters, which perform a weighted sum over the sliding window of successive symbols. Recent innovations in FIR filters are disclosed in U.S. Pat. No. 5,867,537 to Applicant, which is hereby incorporated by reference.

Also in the prior art, it is known that all possible output values of an FIR filter may be precomputed and stored in a look-up table, providing the number of symbols L over the sliding FIR filter window is not too large. The number of stored output waveforms must be $M^L$ when using symbols selected from an alphabet of M possible values. To reduce this number, U.S. Pat. No. 5,867,537 to Applicant splits the look-up table into two tables, each addressed by L/2 symbols. When M is large, for example 8 in an exemplary implementation, the size of the look-up table can nevertheless be excessive. Therefore, there is a need to reduce the size of look-up tables for generating filtered modulation waveforms for 8-PSK and similar modulations.

SUMMARY OF THE INVENTION

A linearly-filtered 8-PSK signal for transmission is formed by dividing each 8-PSK symbol into its three constituent information bits B1, B2, and B3. Bits B1 and B3 are combined to form a first derived bit denoted B1'. Bits B2 and B3 are combined to form a second derived bit denoted B2'. All the bit values are regarded as having values of +1 or −1. Successive ones of the B1 bits are then clocked into a first register of length L bits, the L register bits addressing a look-up table holding filtered signal values based on a length-L impulse-response filter. For each new B1 bit clocked into the first register, a number of first filtered signal values corresponding to instants within one symbol period are extracted from the look-up table. Similarly, the B2, B1', and B2' bits are clocked into respective registers and used to address filtered second, third, and fourth signal values respectively. Then the first filtered signal values are combined with the second filtered signal values to form one of the two complex parts of the desired complex filtered signal for transmission. The third filtered signal values are combined with the fourth filtered signal values to form the other of the two complex parts of the desired, filtered, complex signal. The resulting filtered, complex signal values are then used to modulate a linear transmitter.

Thus according to the above embodiment, the look-up table used to represent filtered values is reduced from $8^L$ values to $2^L$ values. The look-up table has, moreover, +/− symmetry allowing it to be further reduced by one-half. Thus, when using the invention, look-up tables of reasonable size may be used to generate a filtered 8-PSK signal.

In a preferred implementation, the look-up tables hold single-bit, oversampled sigma-delta representations of the filtered waveforms over each symbol period. These may be converted to analog waveforms by simple low-pass filtering, thus eliminating D-to-A convertors.

DETAILED DESCRIPTION OF THE INVENTION

Figure 1:
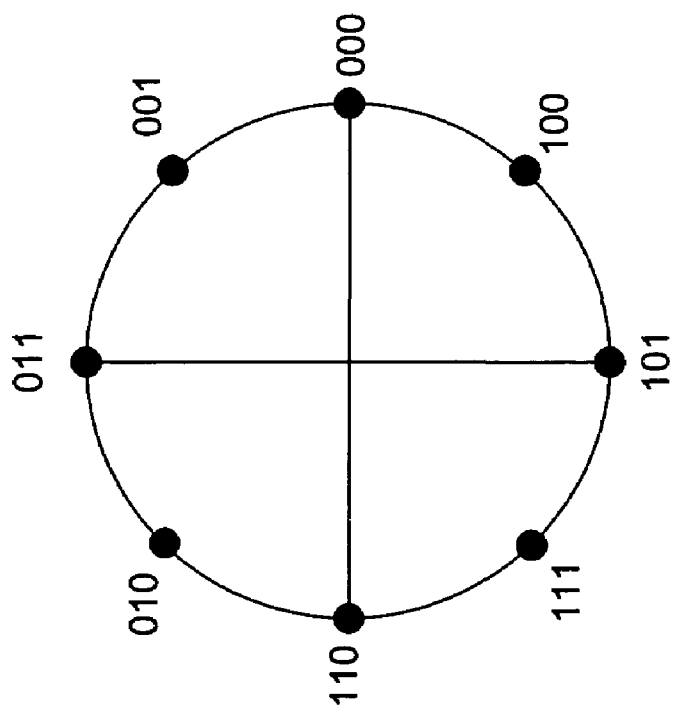
FIG. 1 is a conventional 8-PSK signal constellation.

FIG. 1 shows a conventional 8 point signal constellation used in the prior art for 8-PSK modulation. The signal constellation is a geometric representation of the modulation scheme. Each signal point on the constellation represents a two dimensional vector with I and Q components, where I represents the real part of a complex waveform and Q represents the imaginary part of the complex waveform. According to the prior art, octal symbols comprising three information bits are mapped to points on the signal constellation. The corresponding waveform is then generated and impressed on the phase of the carrier to transmit the octal symbol. There is a one-to one correspondence between possible octal symbols and signal points in the constellation. Thus, a signal constellation includes $2^n$ signal points, where n equals the number of symbol bits. In 8-PSK modulation, the input symbols have 3 bits, B1, B2, and B3, and the signal constellation has 8 points corresponding to the eight possible symbols. Each signal point in the constellation has one of eight possible values:

| |
|---|
| +1 |
| −1 |
| +j |
| −j |
| (1 + j)/root2 |
| (1 − j)/root 2 |
| (−1 + j)/root2 |
| (−1 − j)/root 2 |

FIG. 1 shows one mapping used to assign symbols to signal points on the signal constellation. While this mapping may be done in many ways, the preferred assignment is to use Gray encoding. When Gray encoding is used, adjacent signal points differ by only one binary digit. Because the most likely error caused by noise involves the erroneous detection of an adjacent phase at the receiver, only a single bit error occurs in the k-bit sequence with Gray encoding.

During modulation, L successive symbols S1, S2, S3 . . . S(L), each having one of these 8 values, are combined in an FIR filter having coefficients C1, C2, C3 . . . C(L) to obtain a filtered value V given by the following equation:

$$V=C1.S1+C2.S2+C3.S3 \ldots +C(L).S(L) \qquad \text{Eq. (1)}$$

Since each symbol has one of eight possible values, V may take any one of $8^L$ or $2^{3L}$ possible values. The filter values are pre-computed and stored in a look-up table. For L=7, for example, there would be $2^{21}$ or 2 million complex values for each waveform point, leading to an excessive look-up table size, even after exploiting the 4-fold symmetries that exist.

Figure 2:
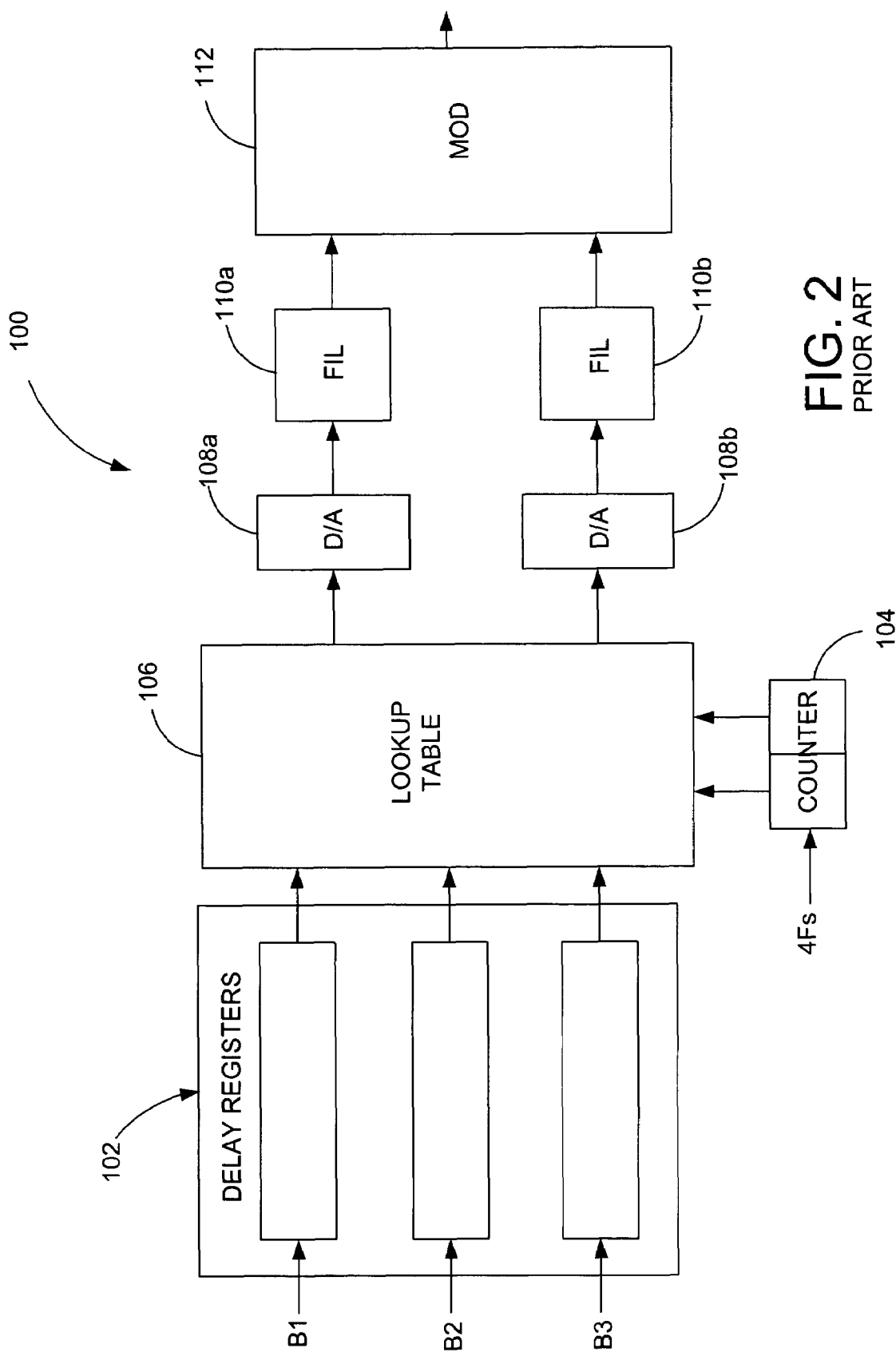
FIG. 2 is a block diagram of a look-up table waveform generator of the prior art.

FIG. 2 illustrates a waveform generator, indicated generally by the numeral 100, used in the prior art for 8-PSK modulation. The waveform generator 100 includes an input register 102, a look-up table 106, a divide by 4 counter 104 for clocking the look-up table 106, a pair of D/A converters 108a,b for converting the real and imaginary values output from the look-up table 106 to analog signals, a pair of filters 110a,b for smoothing output analog signals, and a quadrature modulator 112 for impressing the generated waveforms onto a carrier signal. Octal symbols comprising three information bits each are clocked sequentially into register 102, which stores the last L symbols. The 3L bits from the register 102 are applied to look-up table 106, which stores filtered waveform values V representing filtered segments of the modulation waveform. To describe a signal waveform corresponding to the filtered signal, several numerical samples corresponding to a plurality of sampling points on the waveform over each symbol period must be stored, and each numerical sample comprises a real and an imaginary value. The number of sampling points per symbol period is called the oversampling factor, and must be high enough to represent the smoothly changing waveform, thus avoiding the need for stringent additional smoothing filters to take out excessive step-changes. For example, if an oversampling factor of 4 is used, four real and four imaginary values of perhaps 8-bit precision each must be stored for each symbol period, giving a memory size of $2\times4\times8\times2^{21}$ bits, or 128 megabits, which is a very large memory. The 4 successive sampling points within each symbol period are selected by sequencing divide by 4 counter 104 through its four states 11, 01, 10, 11 using a 4× symbol-rate clock. The real and imaginary waveform values output from the look-up table 106 are converted to analog signals by the D/A converters 108a and 108b, and then the analog outputs are smoothed to remove the steps at the oversampling rate by filters 110a and 110b. The complex analog modulation waveform is then applied to I, Q or quadrature modulator 112 to generate the octal modulated signal at a given radio carrier frequency. Quadrature modulators and improvements thereto are described in U.S. Pat. No. 5,530,722 which is hereby incorporated by reference herein.

One drawback to look-up table waveform generators of the prior art is that the number of filtered waveform values V that must be pre-computed and stored is exponentially related to the number L of consecutive symbols used to generate the filtered waveform values V. Thus, when L becomes large, the number of filtered waveform values V that must be pre-computed and stored quickly becomes unmanageable. In the example given where L=7, there are $2^{21}$ or $8^7$ complex values that need to be pre-computed and stored in the look-up table.

Figure 3:
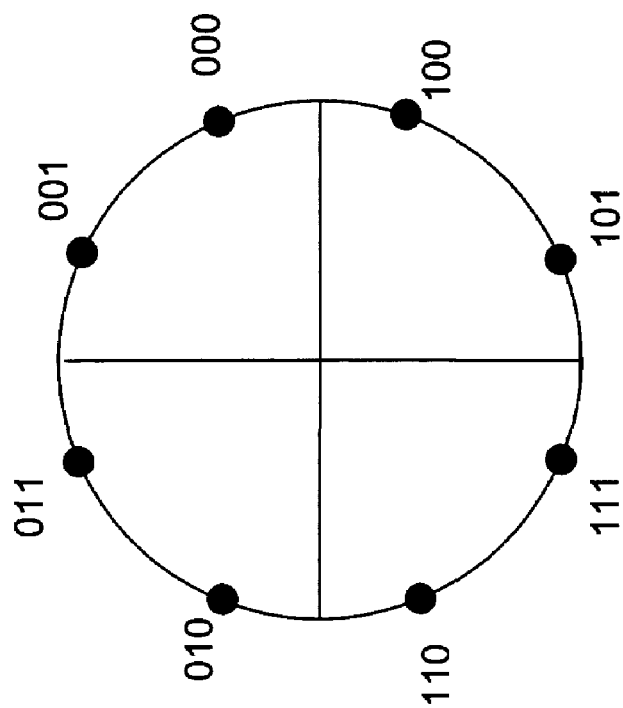
FIG. 3 is a rotated 8-PSK signal constellation used in the present invention.

It is possible to reduce the number of complex waveform values V that must be pre-computed and stored by rotating the signal constellation 22.5 degrees as shown in FIG. 3. Using the rotated signal constellation, the real and imaginary parts of the 8 possible constellation points are always one of the four values:

| |
|---|
| + sin(22.5°) |
| − sin(22.5°) |
| + sin(67.5°) |
| − sin(67.5°) |

These values are related to the three 8-PSK bits by the following linear equations:

$$I=aB2-bB2.B3 \qquad \text{Eq. (2)}$$

$$Q=aB1+bB1.B3 \qquad \text{Eq (3)}$$

where a=0.5[sin(67.5°)+sin(22.5°)] and b=0.5[sin(67.5°)−sin(22.5°)]. B1.B3 is still a binary value, which can be denoted by B1'. Likewise, −B2.B3 is still a binary value, which can be denoted by B2'.

Using the rotated signal constellation, the real or I waveform points become expressible as linear functions of two bits B1, B1' and the imaginary or Q waveform points become expressible as linear functions of B2, B2'. Denoting the filtering operation by a function F, then the following relationship exists between the I and Q waveforms and the binary values B1, B1', B2, and B2':

$$F(I)=F(aB2-bB2.B3)=aF(B2)+bF(B2') \qquad \text{Eq (4)}$$

$$F(Q)=F(aB1+bB1.B3)=aF(B1)+bF(B1') \qquad \text{Eq (5)}$$

The coefficients a and b are the same as defined above. Of course, using other relations between the three bits and the I and Q values other octal constellations may be produced according to the present invention.

By separately producing filtered waveforms F(B1), F(B1'), F(B2) and F(B2') from sequences of B1, B1', B2 and B2', and post-combining the filtered waveforms using weighting factors a and b as defined above, it is only necessary to construct a look-up table for filtering binary bit sequences.

Figure 4:
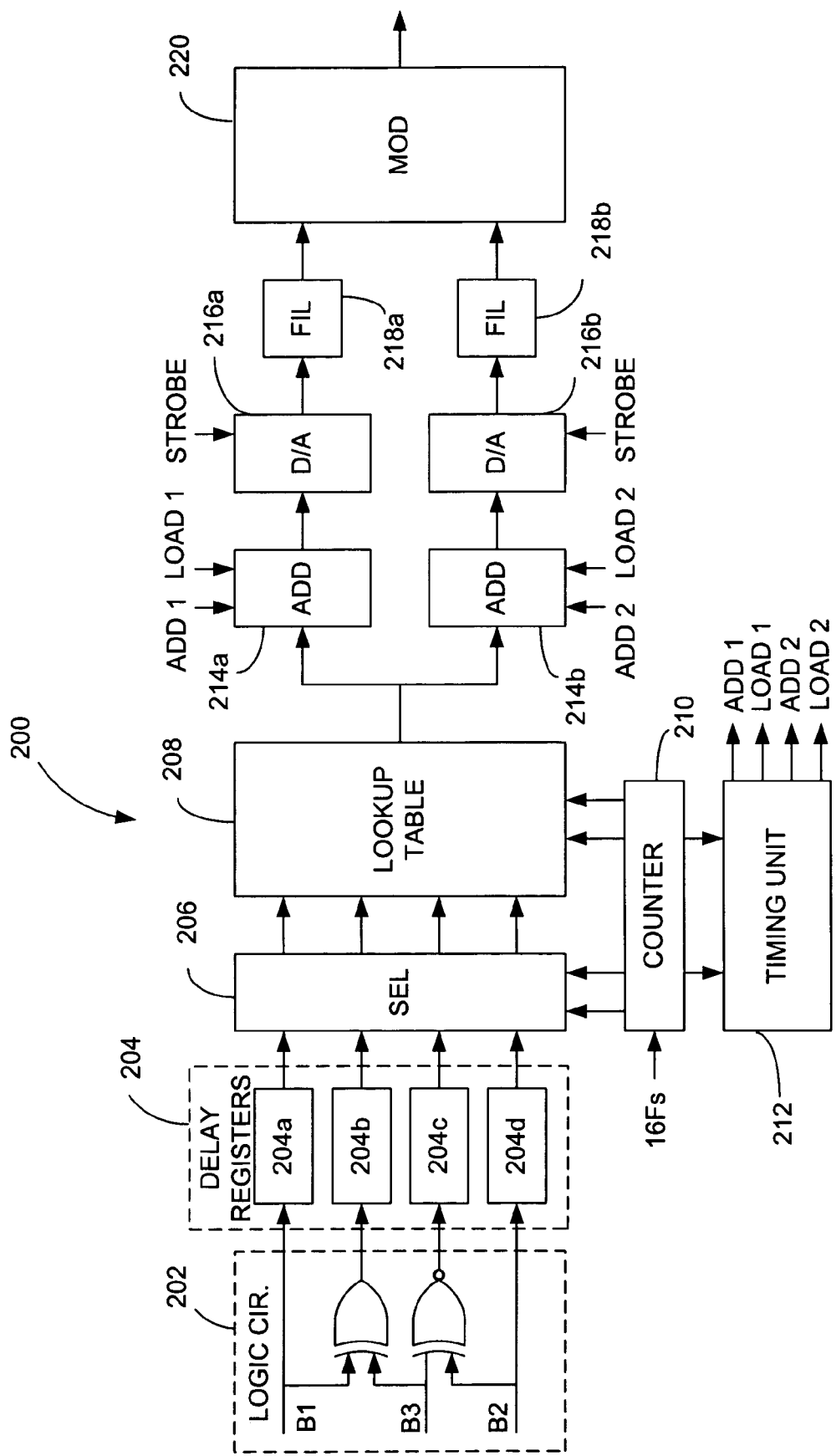
FIG. 4 is a block diagram of a reduced look-up table waveform generator according to the present invention.

FIG. 4 illustrates a waveform generator according to the present invention that implements the rotated signal constellation indicated generally by the numeral 200. The waveform generator 200 includes a logic circuit 202 for combining the bits of the octal symbol, a register 204, a selector 206, a look-up table 208, a divide-by-4 counter 210, a timing unit 212, two adders 214a,b, two D/A converters 216a,b, two filters 218a,b, and a quadrature modulator 220. Look-up table 208 stores filtered waveform segment data which may, for example, contain numerical samples of filtered waveform segments. Logic 202 receives three-bit 8-PSK symbols comprising bits B1, B2, B3 at a symbol rate Fs. Bits B1, B2, B3 correspond to a segment of a modulation waveform. Logic 202 outputs bits B1, B1', B2 and B2' to four registers 204a, 204b, 204c and 204d at a symbol rate Fs. Registers 204a–204d equate to register 102 of FIG. 2. Registers 204a–204d contain bit sequences that are used to address look-up table 208. Registers 204a–204d are selected in turn by selector 206, which is controlled by counter 210 and timing unit 212 to be the source of the L-bit address for look-up table 208. Look-up table 208 now stores $2^L$ real waveform values per oversampling point, as opposed to the $2^{3L}$ of the prior art look-up table 106 of FIG. 2. When L=7, table 208 thus need store only 128 waveform values per oversampling point, or even 64 when +/− symmetry is exploited, making a total of 256 waveform values for four samples per symbol. The waveform values obtained from look-up table 208 when seven successive B1 bits are selected as the address by selector 206, representing a segment of waveform F(B1), are loaded into holding register 214b. The waveform values obtained using seven B2 bits, representing a segment of waveform F(B2), are loaded into register 214a. When a waveform value is extracted using seven B1' bits as the address, which represent a segment of waveform F(B1'), the extracted waveform value is added to register 214b. When seven B2' bits are used to address the look-up table 208 which represent a segment of waveform F(B2'), the extracted waveform value is added to register 214a. The addition in both cases being done with a weighting factor of a:b as shown in Equations 4 and 5. The addition operation is not explicitly shown in FIG. 4 but understood to be incorporated into accumulator registers 214a,b. Four waveform values are output. Thus a final I-value and a Q-value are obtained in registers 214b, 214a which are then latched into D/A converters 216a,b at an oversampling rate of 4 Fs and converted by D/A converters 216a, 216b to analog signals as before. The analog signals are filtered by filters 218a, 218b, and modulated by quadrature modulator 220. Counter 210 is sequenced through its states using a clock of 16 times the symbol rate to generate output values with an oversampling ratio of 16/4.

It is also possible to use the resistive network FIR filter techniques as described in U.S. Pat. No. 5,867,537 or in my co-pending application filed simultaneously herewith entitled "Combined Transmit Filter and D-to-A Conversion", the latter being also hereby incorporated by reference herein. These disclosures describe how to produce the FIR filtering function for a binary chip or bit sequence using resistive combining networks to implement the weighting coefficients C1 . . . C(L). Thus, another implementation of the invention uses four filters constructed using any of the incorporated resistive combining network techniques to generate filtered waveforms F(B1), F(B2), F(B1') and F(B2') which are then combined in the ratio a:b with a plus and a minus sign respectively to generate the imaginary and the real Q and I modulating waveforms. The weighting ratio a:b may be simply arranged by choosing the impedance levels of the networks producing F(B1) and F(B2) to have the ratio b/a to the impedance level of the networks producing F(B1') and F(B2'), addition then being achieved by simply wiring the outputs F(B1) and F(B1') in parallel, and likewise for F(B2) and F(B2').

Figure 5:
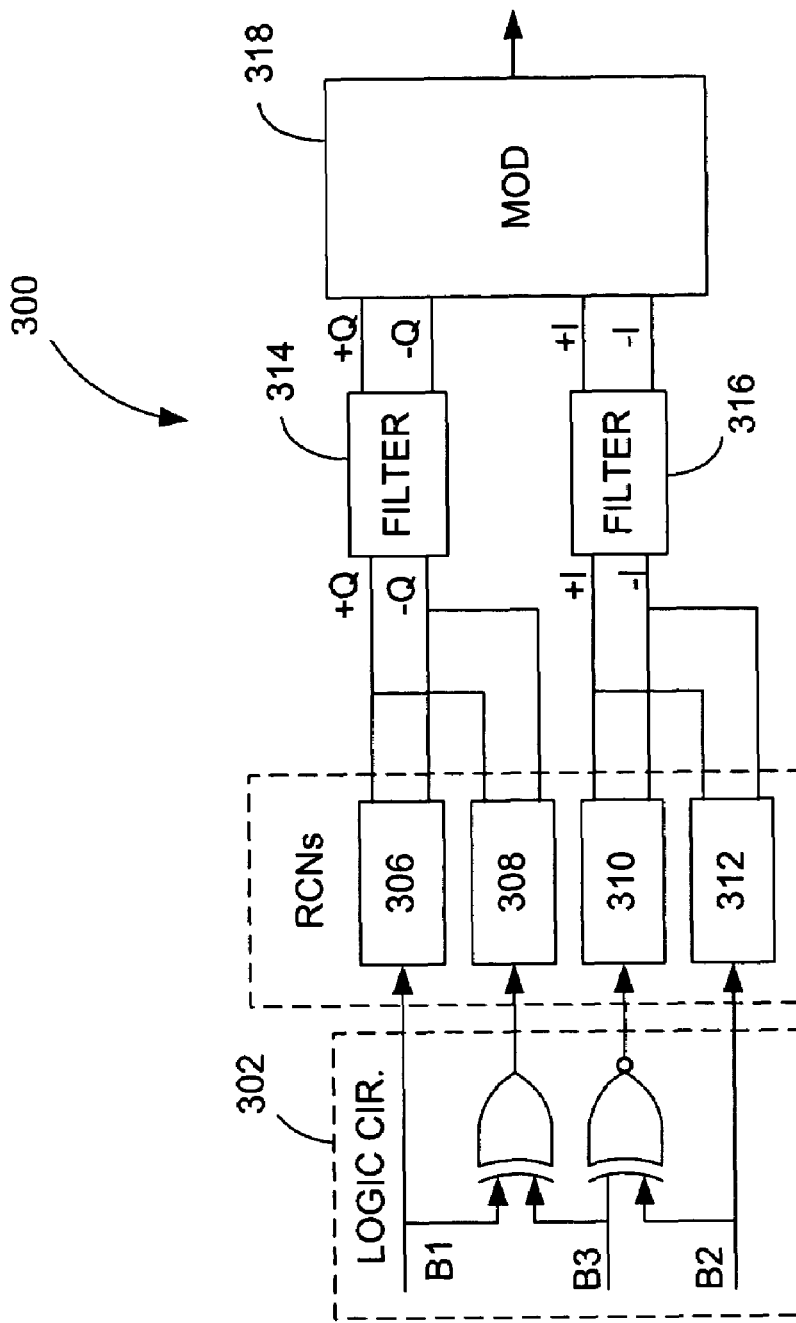
FIG. 5 is an second embodiment of the waveform generator according to the present invention.

FIG. 5 is a block diagram of a waveform generator 300 according to the present invention that uses resistive combining networks to generate the Q and I waveforms. The waveform generator 300 includes a logic unit 302, shift registers/resistive combining networks 306, 308, 310, 312, balanced filters 314,316, and a quadrature modulator 318. Resistive combining networks 306, 308, 310, 312 may, for example, be constructed as shown in my U.S. Pat. No. 5,867,537, or in my co-pending application entitled "Combined Transmit Filter and D-to-A Converter," filed simultaneously herewith. An 8-PSK symbol stream composed of 3 bit streams B1, B2, B3 enters logic unit 302 to form B1' and B2' streams as before. Bit streams B1, B1' then drive shift-register/resistive combining networks 306 and 308, to generate filtered Q waveform values at an oversampling rate of, for example, four waveform values per symbol, as described in the above-incorporated references. The outputs of resistive combining networks 306, 308 are added in the ratio a:b simply by arranging their relative impedance scalings Za and Zb respectively to be in the ratio Za:Zb=b:a and wiring their outputs in parallel. Bit streams B2 and B2' are input to registers/resistive combining networks 310 and 312 respectively to generate filtered I waveform values at the same oversampling rate. The outputs of resistive combining networks 310, 312, having impedance scaling Za and Zb respectively, are added in the same a:b ratio. Thus, balanced Q and I signals are generated that can be further filtered using balanced filters 314 and 316 to remove the 4 Fs steps before application to a balanced modulator 318.

D/A converters are so-called mixed signal components (part digital, part analog technology) which one would rather avoid in the interests of being able to integrate functions into a digital integrated circuit chip. Likewise, the resistive combining networks of FIG. 5 cannot always be constructed in a particular integrated circuit technology. Therefore, there is a need for an implementation that avoids using analog circuit technology.

In the prior art, a known form of digital representation of analog signals is delta-sigma modulation. Delta sigma modulation represents a signal between 0 and 1 by a fast alternating sequence of 0's and 1's that contains a ratio of 1's to 0's, such as to give the desired mean value. The sequence can be chosen so that the error waveform, which is the difference between the 1/0 waveform and the desired waveform, has reduced low frequency content and mostly high-frequency content that can be easily removed with a simple low-pass filter. Thus, once a delta-sigma representation is generated, it can be converted to an analog waveform with a simple low-pass filter. A bipolar signal can be represented as the difference between two complementary delta-sigma waveforms, which are then filtered by a balanced filter as disclosed in the above-incorporated '722 patent.

In the prior art, it was also known to generate delta-sigma representations of a filtered modulation waveform over a symbol period as a sequence of 1's and 0's by using a computer off-line, i.e., during the design process, which sequences could then be remembered in a look-up table. This technique is employed in cellular telephones conforming to the GSM standard manufactured and sold worldwide by L.M. Ericsson since 1992. The current invention allows this economical technique to be extended to higher order constellations such as 8-PSK or 16-QAM without excessively large look-up tables.

When the look-up table stores delta-sigma encoded waveform values, the waveforms can be read one or more bits at a time into a holding register successively for addresses given by L bits of B1, B1', B2 and B2'. The holding registers for B1, B1' are then clocked out and their outputs are added in the ratio a:b using two resistors, for example. Preferably, the complementary waveforms are generated at the same time and the waveform and its complement form a balanced I-signal which is filtered with a balanced filter to drive a balanced modulator, as described in the above-incorporated '722 patent to Applicant. Likewise, the holding registers for B2, B2' are clocked out to generate a balanced Q-signal.

Figure 6:
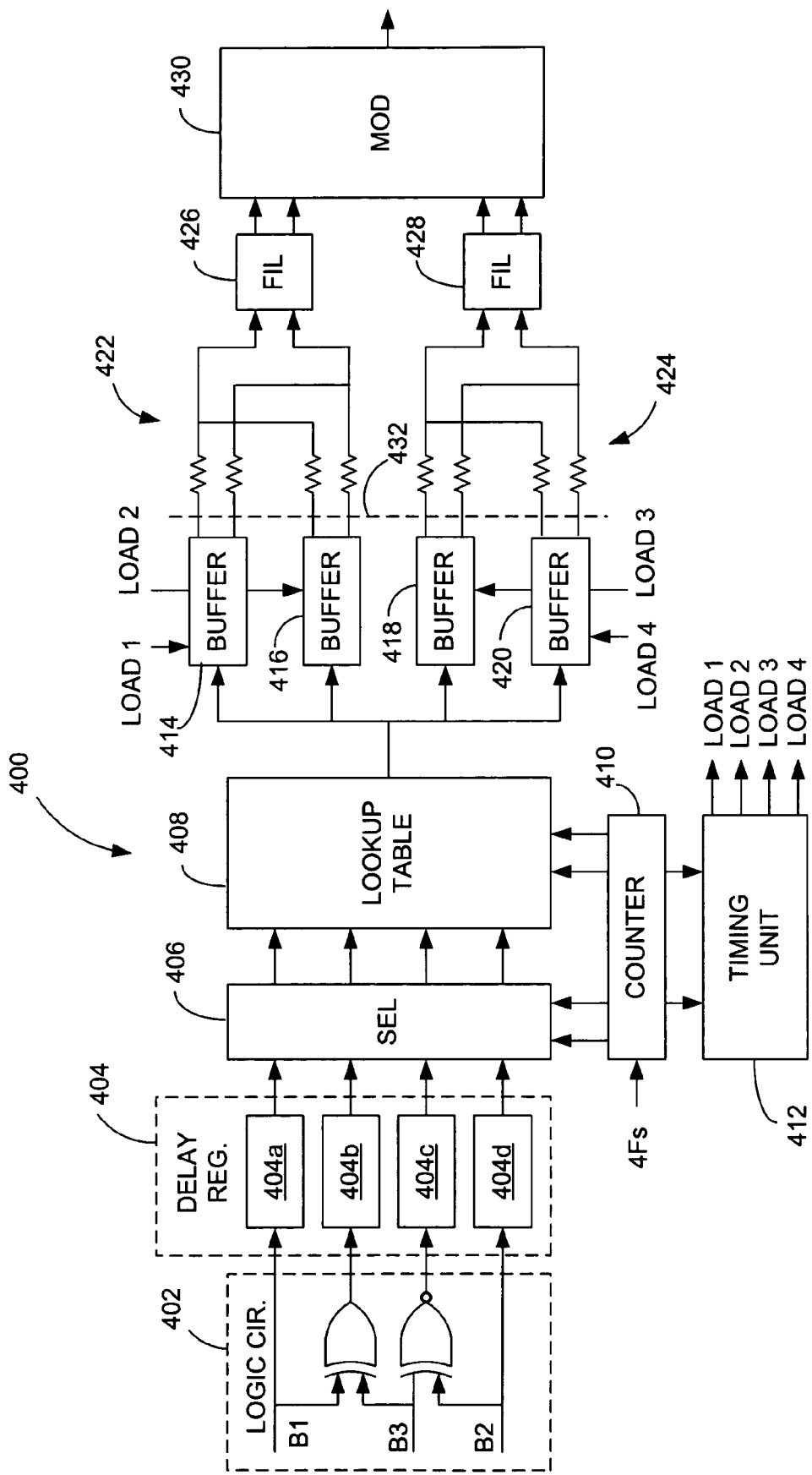
FIG. 6 is a third embodiment of the waveform generator according to the present invention.

A waveform generator for generating 8-PSK waveforms using 48 times oversampled delta sigma representations is shown in FIG. 6 and is indicated generally at 400. The waveform generator 400 includes a logic circuit 402, shift registers 404a, 404b, 404c, 404d, selector 406, look-up table 408, divide by four counter 410, timing unit 412, buffers 414, 416, 418, and 420, resistive networks 422, 424, balanced filters 426,428, and a balanced quadrature modulator 430. Octal symbols (B1, B2, B3) enter logic 402 at the symbol rate Fs. Logic 402 outputs B1, B2, B1' and B2' at rate Fs to registers 404a–404d. Selector 406 and counter 410, which is driven at 4 Fs, select registers 404a, 404b, 404c, and 404d in proper sequence to be output to the address input of look-up table 408. Timing generator 412 generates a timing pulse to one of the buffers 414, 416, 418, or 420 respectively to latch the output of table 408 for each address input. In the exemplary implementation of FIG. 6, look-up table 408 outputs all 48 sigma-delta samples per symbol period at a time, which are latched in one of the four 48-bit buffers 414, 416, 418, or 420. When all buffers are full, their 48-bit contents are clocked out serially at the rate 48 Fs. It will be appreciated that, in order to be able to load a new 48-bit value while the last 48-bit value is still being clocked out, buffers 414, 416, 418, and 420 should be double-buffers, also known as parallel-to-serial converters.

Buffers 414, 416, 418, and 420 preferably output each bit and its complement in order to generate a balanced, bipolar sigma-delta waveform representation. The outputs of buffers 414, 416, which correspond to bitstreams B2 and B2' and when added in the ratio a:b by proper choice of Za and Zb, generate the I-part of the desired filtered 8-PSK waveform. Likewise buffers 418, 420, which correspond to bitstreams B1 and B1' and when added in the ratio a:b, generate the Q-part of the 8-PSK waveform. These balanced I,Q waveforms contain high-frequency sigma-delta quantizing noise due to the 48-times oversampled sigma-delta representation stored in table 408, which however, is easily removed by simple, balanced low pass filters 426, 428 before quadrature modulation, as described in the '722 patent. Bus widths other than 48 may be used between table 408 and buffers 414, 416, 418, and 420 if more convenient. For example, table 408 can output the 48 bits as six, 8-bit bytes at a rate of 6 Fs by supplying another three address bits from a divide-by-6 counter clocked at 24 Fs. By suitable design of a divide-by-24 counter to provide both the two register selection bits and the extra three address bits to table 408, the output bytes can be in the order:

byte 1 for B1
byte 1 for B2
byte 1 for B1'
byte 1 for B2'
byte 2 for B1
byte 2 for B2
byte 2 for B1'
byte 2 for B2'
etc.

allowing buffers 414, 416, 418, and 420 to be reduced to 8-bit parallel to serial convertors which are refilled 6 times over every Fs period.

Using the arrangement of FIG. 6, a digital interface 432 may be constructed between buffers 414, 416, 418, 420 and resister networks 422, 424 so that the circuit excluding the resistors may be fabricated as an entirely digital integrated circuit having eight digital outputs. The resistor networks 422, 424 may be incorporated into an analog integrated circuit comprising the balanced low-pass filters 426, 428 and the quadrature modulator 430. The eight-line interface may alternatively be reduced to four by outputting only one polarity of each waveform, the complementary polarity for forming a balanced signal being created on the analog chip.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

I claim:

1. A method for generating a premodulation-filtered modulation waveform for transmitting octal symbols, the modulation waveform comprising a real part and an imaginary part comprising:

inputting to a logic unit successive octal data symbols, each comprising first, second and third information bits;

forming in said logic unit a first derived bit by combining the first and third information bits and a second derived bit by combining the second and third information bits;

forming first, second, third and fourth address bit sequences by collecting successive first information bits, second information bits, first derived bits, and second derived bits respectively in corresponding registers;

generating first, second, third, and fourth filtered waveform segments based on said first, second, third, and fourth bit sequences;

combining the first and third filtered waveform segments to obtain a segment of said imaginary part of said modulation waveform; and combining the second and fourth filtered waveform segments to obtain a segment of said real part of said modulation waveform.

2. The method of claim 1 in which said logic unit forms said first derived bit by an exclusive OR operation on said first and third information bits.

3. The method of claim 1 in which the logic unit forms the second derived bit by an exclusive OR operation on the second and third information bits and complementing the result.

4. The method of claim 1 in which the filtered waveform segments are represented by a plurality of numerical samples spaced over each symbol period.

5. The method of claim 1 in which the filtered waveform segments are represented by a sequence of sigma-delta values.

6. The method of claim 5 in which the filtered waveform segments are produced as a balanced signal represented on two outputs and are represented by a sequence of sigma-delta values and its complement.

7. The method of claim 1 in which the modulation waveform is generated in balanced form on two outputs for each of the real and imaginary parts.

8. The method of claim 1 in which combining first and third filtered waveform segments comprises forming a weighted sum of one or more numerical samples of the first filtered waveform segment with corresponding numerical samples of the third filtered waveform segment.

9. The method of claim 1 in which combining second and fourth filtered waveform segments comprises forming a weighted sum of one or more numerical samples of the second filtered waveform segment with corresponding numerical samples of the fourth filtered waveform segment.

10. The method of claim 1 in which combining first and third filtered waveform segments comprises connecting the first filtered waveform segment through a first impedance to an output terminal and connecting the third filtered waveform segment through a second impedance to said output terminal to produce a weighted sum of the combined first and third filtered waveform segments at said output terminal.

11. The method of claim 1 in which combining second and fourth filtered waveform segments comprises connecting the second filtered waveform segment through a first impedance to an output terminal and connecting the fourth filtered waveform segment through a second impedance to said output terminal to produce a weighted sum of the combined second and fourth filtered waveform segments at said output terminal.

12. The method of claim 1 in which generating first, second, third, and fourth filtered waveform segments comprises using the first, second, third, and fourth bit sequences respectively as an address to a look-up table containing one or more numerical samples of the first, second, third, and fourth filtered waveform segments.

13. The method of claim 12 in which the look-up table contains sigma-delta representations of the first, second, third, and fourth filtered waveform segments.

14. The method of claim 1 in which generating first, second, third, and fourth filtered waveform segments comprises outputting the first, second, third, and fourth bit sequences or their complements to a corresponding resistive combining network.

15. The method of claim 1 in which generating first, second, third, and fourth filtered waveform segments comprises outputting the first, second, third and fourth bit sequences and their complements to corresponding first and second complementary resistive combining networks to generate a balanced filtered waveform segment on two outputs corresponding to each of the first, second, third and fourth bit sequences.

16. The method of claim 15 in which combining filtered waveform segments corresponding to the first and third bit sequences comprises connecting the outputs of the corresponding resistive combining networks together.

17. The method of claim 16 in which the resistive combining networks corresponding to the first and third filtered waveforms have a relative impedance scaling to effect a predetermined weighted sum.

18. The method of claim 15 in which combining filtered waveform segments corresponding to the second and fourth bit sequences comprises connecting the outputs of the corresponding resistor networks together.

19. The method of claim 18 in which the resistive combining networks corresponding to the second and fourth filtered waveforms have a relative impedance scaling to effect a predetermined weighted sum.

20. The method of claim 1 in which the octal symbols are 8-PSK symbols.

21. A method for generating a modulation waveform for transmitting data symbols, the modulation waveform comprising a real part and an imaginary part comprising:

inputting data symbols to a logic unit over a plurality of successive symbol periods, wherein each data symbol comprises a plurality of information bits:

forming in the logic unit at least two derived bits during each symbol period by combining selected information bits;

forming, during each symbol period, a plurality of bit sequences, each bit sequence containing bits input or derived over a plurality of symbol periods;

generating, during each symbol period, a plurality of filtered waveform segments using the bit sequences;

combining, during each symbol period, at least two of the filtered waveform segments to obtain a segment of the imaginary waveform part;

combining, during each symbol period, at least two of the filtered waveform segments to obtain a segment of the real waveform part, wherein the modulation waveform is generated in balanced form on two outputs for each of the real and imaginary parts.

22. The method of claim 21 wherein the data symbol comprises first, second, and information bits.

23. The method of claim 22 in which the logic unit forms a first derived bit by an exclusive OR operation on first and third information bits.

24. The method of claim 22 in which the logic unit forms a second derived bit by an exclusive OR operation on second and third information bits and complementing the result.

25. The method of claim 21 in which the filtered waveform segments each comprise a number of numerical samples spaced over each symbol period.

26. The method of claim 21 in which the filtered waveform segments are represented by a sequence of sigma-delta values.

27. The method of claim 21 in which the filtered waveform segments are produced as a balanced signal represented on two outputs and are represented by a sequence of sigma-delta values and its complement.

28. The method of claim 21 in which combining at least two of the filtered waveform segments to form a segment of the imaginary part of the modulation waveform comprises forming a weighted sum of a numerical sample of a first filtered waveform segment with a numerical sample of at least one other filtered waveform segment.

29. The method of claim 21 in which combining at least two of the filtered waveform segments to form a segment of the real part of the modulation waveform comprises forming a weighted sum of a numerical sample of a first filtered waveform segment with a numerical sample of at least one other filtered waveform segment.

30. The method of claim 21 in which combining at least two of the filtered waveform segments to form a segment of the imaginary part of the modulation waveform comprises connecting a first filtered waveform segment through a first impedance to an output terminal and connecting a second filtered waveform segment through a second impedance to the output terminal to produce a weighted sum of the combined filtered waveform segments at the output terminal.

31. The method of claim 21 in which combining at least two of the filtered waveform segments to form a segment of the real part of the modulation waveform comprises connecting a first filtered waveform segment through a first impedance to an output terminal and connecting a second filtered waveform segment through a second impedance to the output terminal to produce a weighted sum of the combined filtered waveform segments at the output terminal.

32. The method of claim 21 in which generating a plurality of filtered waveform segments comprises using the bit sequences as an address to a look-up table containing pre-computed filtered numerical samples of the filtered waveform segments.

33. The method of claim 32 in which the look-up table contains oversampled sigma-delta representations of the pre-computed filtered waveform segments.

34. The method of claim 21 in which generating a plurality of filtered waveform segments includes inputting the bit sequences and their complements to a resistive combining network.

35. The method of claim 34 in which generating a plurality of filtered waveform segments comprises inputting the bit sequences and their complements to corresponding first and second complementary resistive combining networks to generate balanced filtered waveform segments on two outputs corresponding to each of the bit sequences.

36. The method of claim 35 in which a first filtered waveform segment corresponds to a bit sequence comprising a plurality of first information bits, a second filtered waveform segment corresponds to a bit sequence comprising a plurality of second information bits, a third filtered waveform segment corresponds to a plurality of first derived bits, and a fourth filtered waveform segment corresponds to a plurality of second derived bits.

37. The method of claim 36 wherein the first filtered waveform segment is added to the third filtered waveform segment and the second waveform segment is added to the fourth filtered waveform segments by connecting the outputs of the corresponding resistive combining networks together.

38. The method of claim 37 in which the connected resistive combining networks have a relative impedance to effect a predetermined a weighted sum.

39. The method of claim 21 in which the data symbols are 8-PSK symbols.

40. A waveform generator for generating, from sequence of data symbol each having a plurality of information bits, a modulation waveform having a real part and an imaginary part, said waveform generator comprising:

a logic unit having an input for receiving said data symbols and an output, wherein the logic unit combines, during each symbol period, selected information bits comprising the data symbol to produce two or more derived bits, and wherein selected information bits and the derived bits are presented at the output of the logic unit;

a delay register connected to the output of the logic unit for storing a plurality of bit sequences, wherein each bit sequence comprises bits selected from the information bits and the derived bits over a plurality of symbol periods;

a filter generating a filtered waveform segment during each symbol period from the bit sequences;

a first combiner combining, during each symbol period, at least two of the filtered waveform segments to obtain a segment of the imaginary part of the modulation waveform; and a second combiner combining, during each symbol period, at least two of the filtered waveform segments to obtain a segment of said real part of the modulation waveform, wherein the first and second combiners comprise first and second two-wire resistive combining networks for generating respectively the real and imaginary part of the modulation waveform in balanced form.

41. The waveform generator of claim 40 wherein the filter comprises a look-up table storing waveform segment data corresponding to a plurality of filtered waveform segments, and wherein the waveform segment data is addressed by the bit sequences.

42. The waveform generator of claim 41 wherein the waveform segment data comprises a plurality of numerical values corresponding to samples of the filtered waveform segment spaced over the symbol period.

43. The waveform generator of claim 41 wherein the waveform segment data comprises a sequence of binary values using an oversampled sigma-delta representation.

44. The waveform generator of claim 43 wherein said first combiner comprises a two-wire resistive combining network for generating the real part of said waveform in balanced form from the sigma-delta representation of a first waveform segment, and the second combiner comprises a two-wire resistive combining network for generating the imaginary part of the waveform from the sigma-delta representation of a second waveform segment.

45. The waveform generator of claim 40 wherein the first combining network forms a weighted sum of first and second filtered waveform segments, and the second combining network forms a weighted sum of third and fourth filtered waveform segments.

46. The waveform generator of claim 40 wherein the bit sequences or their complements are output from the delay registers to respective resistive combining networks to form filtered waveform segments.

47. The waveform generator of claim 40 wherein the bit sequences and their complements are output from the delay registers to first and second complementary resistive combining networks to form balanced waveform segments on two wires.

48. The waveform generator of claim 40 including four delay registers for storing respectively sequences of a first information bit, a second information bit, a first derived bit, and a second derived bit over a predetermined number of symbol periods.

49. The waveform generator of claim 48 wherein the bit sequences stored in said first, second, third, and fourth registers are used to generate respectively a first waveform segment, a second waveform segment, a third waveform segment, and a fourth waveform segment.

50. The waveform generator of claim 49 wherein the first and third waveform segments are combined to generate the real part of the modulation waveform, and said second and fourth waveform segments are combined to form the imaginary part of the modulation waveform.

51. The waveform generator of claim 49 wherein the filter comprises a memory storing a plurality of waveform segments and wherein the bit sequences are used to address the memory.

52. A method of generating filtered modulation signals, comprising:
receiving over a plurality of symbol periods successive data symbols to be transmitted, each data symbol comprising a plurality of input bits;
combining the input bits in said data symbols to generate derived bits;
bitwise filtering selected input bits and derived bits to generate component waveforms;
generating a filtered quadrature modulation waveform signal having a real part and an imaginary part by selectively combining the component waveforms using weighting factors selected to produce a desired signal constellation, wherein the modulation waveform is generated in balanced form on two outputs for each of the real and imaginary parts.

53. The method of claim 52 wherein bitwise filtering selected input bits and derived bits to generate component waveforms comprises:
generating during each symbol period a plurality of address bit sequences corresponding to selected ones of the input bits and derived bits, wherein each address bit sequence comprises a plurality of input bits or derived bits received or generated over a plurality of symbol periods;
storing pre-computed component waveforms in a lookup table;
using the address bit sequences generated during each symbol period to select the component waveforms to be combined to generate the quadrature modulation signal.

54. The method of claim 53 in which the filtered waveform segments are stored as one or more numerical sample values.

55. The method of claim 54 wherein generating a filtered quadrature modulation waveform signal having a real part and an imaginary part by selectively combining the component waveforms using weighting factors using weighting factors selected to produce a desired signal constellation comprises:
adding at least two component waveforms in a first adder to form the imaginary part of the modulation waveform; and
adding at least two component waveforms in a second adder to form the real part of the modulation waveform.

56. The method of claim 54 in which the component waveforms are stored as a set of sigma-delta sample values.

57. The method of claim 56 wherein generating a filtered quadrature modulation waveform signal having a real part and an imaginary part by selectively combining the component waveforms using weighting factors selected to produce a desired signal constellation comprises combining the sigma-delta sample values to produce the real and imaginary parts of the modulation waveform in balanced form.

58. The method of claim 52 wherein bitwise filtering selected input bits and derived bits to generate component waveforms comprises:
generating during each symbol period a plurality of bit sequences corresponding to selected ones of the input bits and derived bits, wherein each bit sequence comprises a plurality of input bits or derived bits received or generated over a plurality of symbol periods;
filtering the bit sequences in respective resistive combining networks to generate the component waveforms.

59. The method of claim 58 wherein selectively combining the component waveforms using weighting factors corresponding to a rotated signal constellation to generate a filtered quadrature modulation signal having a real part and an imaginary part comprises:
combining at least two component waveforms output from first and second resistive combining networks to form the real part of the modulation waveform; and
combining at least two component waveforms output from third and fourth resistive combining networks to form the imaginary part of the modulation waveform.

60. The method of claim 59 wherein combining at least two component waveforms from first and second resistive combining networks to form the real part of the modulation waveform comprises:
connecting the outputs of the first and second resistive combining networks in parallel; and
scaling the relative output impedances of the first and second resistive combining networks to achieve a desired weighting.

61. The method of claim 58 wherein each resistive combining networks include two outputs and wherein the component waveforms are generated in balanced form at the outputs of the resistive combining networks.

62. The method of claim 52 wherein the weighting factors are selected to produce a rotated signal constellation.

63. the method of claim 61 wherein the signal constellation is rotated approximately 22.5 degrees.

64. A waveform generator for generating, from sequence of data symbol each having a plurality of information bits, a modulation waveform having a real part and an imaginary part, said waveform generator comprising:
a logic unit to combine input bits comprising the data symbols during each symbol period to generate derived bits;
a filter to generate component waveforms during each symbol period by bitwise filtering selected input bits and the derived bits;
a first combiner combining, during each symbol period, at least two of the component waveforms to generate the imaginary part of the modulation waveform,
a second combiner combining, during each symbol period, at least two of the component waveforms to generate the real part of the modulation waveform, and
wherein said first and second combiners use weighting factors to combine said component waveforms selected to produce a desired signal constellation, and wherein the first and second combiners comprise first and second resistive combining networks for generating respectively the real and imaginary part of the modulation waveform in balanced form.

65. The waveform generator of claim 64 wherein the filter comprises a lookup table storing pre-computed component waveforms.

66. The waveform generator of claim 65 further comprising a plurality of delay registers storing address bit sequences for selecting the pre-computed waveform segments stored in said memory, wherein each address bit sequence comprises a plurality of input bits or derived bits received or generated over a plurality of symbol periods.

67. The waveform generator of claim 66 wherein the first and second combiners comprise adders to add selected component waveforms.

68. The waveform generator of claim 66 wherein the component waveforms are stored as a set of oversampled numerical values and wherein the first and second combiners comprise:
   a plurality of buffers for storing the oversampled numerical values output by said lookup table; and
   wherein the resistive combining networks combine the oversampled numerical values corresponding to at least two component waveforms to form each of the real and imaginary parts of the modulation waveform.

69. The waveform generator of claim 68 wherein each resistive combining network includes two outputs and wherein the modulation waveforms are generated in balanced form at the outputs of the resistive combining networks.

70. The waveform generator of claim 66 wherein the filter comprises a plurality of resistive combining networks to generate the component waveforms.

71. The waveform generator of claim 70 further comprising a plurality of delay registers storing bit sequences filtered by the resistive combining networks, wherein each address bit sequence comprises a plurality of input bits or derived bits received or generated over a plurality of symbol periods.

72. The waveform generator of claim 71 wherein the first and second combiners comprise summing nodes connected to the outputs of respective resistive combining networks to sum the waveform components.

73. The waveform generator of claim 72 wherein the first and second resistive combining networks each comprise two outputs and generate the waveform components in balanced form.

74. The waveform generator of claim 64 wherein said first and second combiners use weighting factors selected to produce a rotated signal constellation.

75. The waveform generator of claim 64 wherein said first and second combiners use weighting factors selected to produce a signal constellation rotated approximately 22.5 degrees.

* * * * *